US007529281B2

(12) United States Patent  (10) Patent No.: US 7,529,281 B2
Leonardo et al.  (45) Date of Patent: May 5, 2009

(54) LIGHT SOURCE WITH PRECISELY CONTROLLED WAVELENGTH-CONVERTED AVERAGE POWER

(75) Inventors: Manuel J. Leonardo, San Francisco, CA (US); Mark W. Byer, Mountain View, CA (US); Gregory L. Keaton, San Francisco, CA (US); John Nightingale, Portola Valley, CA (US)

(73) Assignee: Mobius Photonics, Inc., Santa Clara, CA (US)

( * ) Notice: Subject to any disclaimer, the term of this patent is extended or adjusted under 35 U.S.C. 154(b) by 46 days.

(21) Appl. No.: 11/456,857

(22) Filed: Jul. 11, 2006

(65) Prior Publication Data

US 2008/0013163 A1 Jan. 17, 2008

(51) Int. Cl.
*H01S 3/10* (2006.01)
*H01S 3/13* (2006.01)

(52) U.S. Cl. .............................. 372/22; 372/21; 372/25; 372/30

(58) Field of Classification Search .................... 372/22, 372/21, 25, 30
See application file for complete search history.

(56) References Cited

U.S. PATENT DOCUMENTS 5,033,051 A  7/1991  Werner ........................... 372/3

(Continued)

FOREIGN PATENT DOCUMENTS

EP  1063742 A1  12/2000

OTHER PUBLICATIONS

P. G. Kazansky, et. al., "Blue-light generation by quasi-phase-matched frequency doubling in thermally poled optical fibers", *Optics Letters*, 20, pp. 843, 1995.

(Continued)

*Primary Examiner*—Armando Rodriguez
(74) *Attorney, Agent, or Firm*—Joshua D. Isenberg; JDI Patent

(57) ABSTRACT

Control of average wavelength-converted power and/or wavelength converted pulse energy is described. One or more seed pulses may be generated and amplified with an optical amplifier to produce one or more amplified pulses. The amplified pulses may be wavelength converted to produce one or more wavelength converted pulses characterized by an average wavelength-converted power or pulse energy. Wavelength-converted power or pulse energy may be controlled by adjusting wavelength conversion efficiency without substantially changing the amplified power or pulse energy. Average wavelength-converted power may be controlled over a time scale comparable to a pulse period of the amplified pulses without adjusting an average power of the amplified pulses over the time scale comparable to a pulse period of the amplified pulses. A wavelength-converted optical system, may comprise a seed source, an optical amplifier optically coupled to the seed source, a wavelength converter optically coupled to the optical amplifier; and a controller operably coupled to the seed source and/or optical amplifier and/or wavelength converter. The controller may include logic adapted to control an average wavelength-converted power of an output of the wavelength converter over a time scale comparable to a pulse period of amplified pulses from the optical amplifier without adjusting an average power of the amplified pulses over that time scale. Alternatively, the controller logic may be adapted to control wavelength-converted pulse energy by adjusting the wavelength conversion efficiency without substantially changing the pulse energy of the amplified pulses.

46 Claims, 5 Drawing Sheets

U.S. PATENT DOCUMENTS

| | | | | |
|---|---|---|---|---|
| 5,745,284 | A | 4/1998 | Goldberg et al. | 359/344 |
| 6,014,249 | A * | 1/2000 | Fermann et al. | 359/341.1 |
| 6,151,338 | A | 11/2000 | Grubb et al. | 372/6 |
| 6,281,471 | B1 | 8/2001 | Smart | 219/121.62 |
| 6,297,903 | B1 | 10/2001 | Grubb et al. | 359/341.3 |
| 6,335,941 | B1 | 1/2002 | Grubb et al. | 372/6 |
| 6,340,806 | B1 | 1/2002 | Smart et al. | 219/121.62 |
| 6,541,731 | B2 | 4/2003 | Mead et al. | 219/121.7 |
| 6,556,342 | B1 * | 4/2003 | Ellison et al. | 359/334 |
| 6,590,698 | B1 | 7/2003 | Ohtsuki et al. | 359/326 |
| 6,678,294 | B1 | 1/2004 | Komine et al. | 372/38.01 |
| 6,703,582 | B2 | 3/2004 | Smart et al. | 219/121.62 |
| 6,711,187 | B2 | 3/2004 | Tanner et al. | 372/30 |
| 6,727,458 | B2 | 4/2004 | Smart | 219/121.62 |
| 6,738,398 | B2 | 5/2004 | Hirata et al. | 372/32 |
| 6,849,824 | B2 | 2/2005 | Arai et al. | 219/121.72 |
| 6,917,631 | B2 | 7/2005 | Richardson et al. | 372/5 |
| 6,977,769 | B2 * | 12/2005 | Matsushita et al. | 359/334 |
| 7,039,076 | B2 | 5/2006 | Kane et al. | 372/6 |
| 7,180,928 | B2 * | 2/2007 | Caprara et al. | 372/70 |
| 2003/0231663 | A1 * | 12/2003 | Ohtsuki et al. | 372/22 |
| 2005/0111500 | A1 | 5/2005 | Harter et al. | |
| 2005/0185683 | A1 | 8/2005 | Ohtsuki | |
| 2006/0109877 | A1 * | 5/2006 | Caton et al. | 372/33 |

OTHER PUBLICATIONS

International Search Report and Written Opinion of the International Searching Authority dated Oct. 31, 2008-International Patent Application No. PCT/US07/72797, 9 pages.

* cited by examiner

LIGHT SOURCE WITH PRECISELY CONTROLLED WAVELENGTH-CONVERTED AVERAGE POWER

FIELD OF THE INVENTION

This invention generally relates to lasers and more particularly to control of average wavelength converted power in pulsed laser systems having a seed source coupled to an optical amplifier.

BACKGROUND OF THE INVENTION

High-powered optical sources have many applications in which an intense beam of light is focused onto a substrate or other target. In many high-power optical source architectures, a signal from a seed source is fed into an optical amplifier that amplifies the power of the signal. One example, among others, of such a high-power optical source architecture is referred as a master oscillator, power amplifier (MOPA) architecture. The MOPA architecture allows precise pulsing of the amplified output. Laser systems based on optical amplification of seed signals are often used in high power applications, such as laser micromachining.

It is within this context that embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Figure 1:
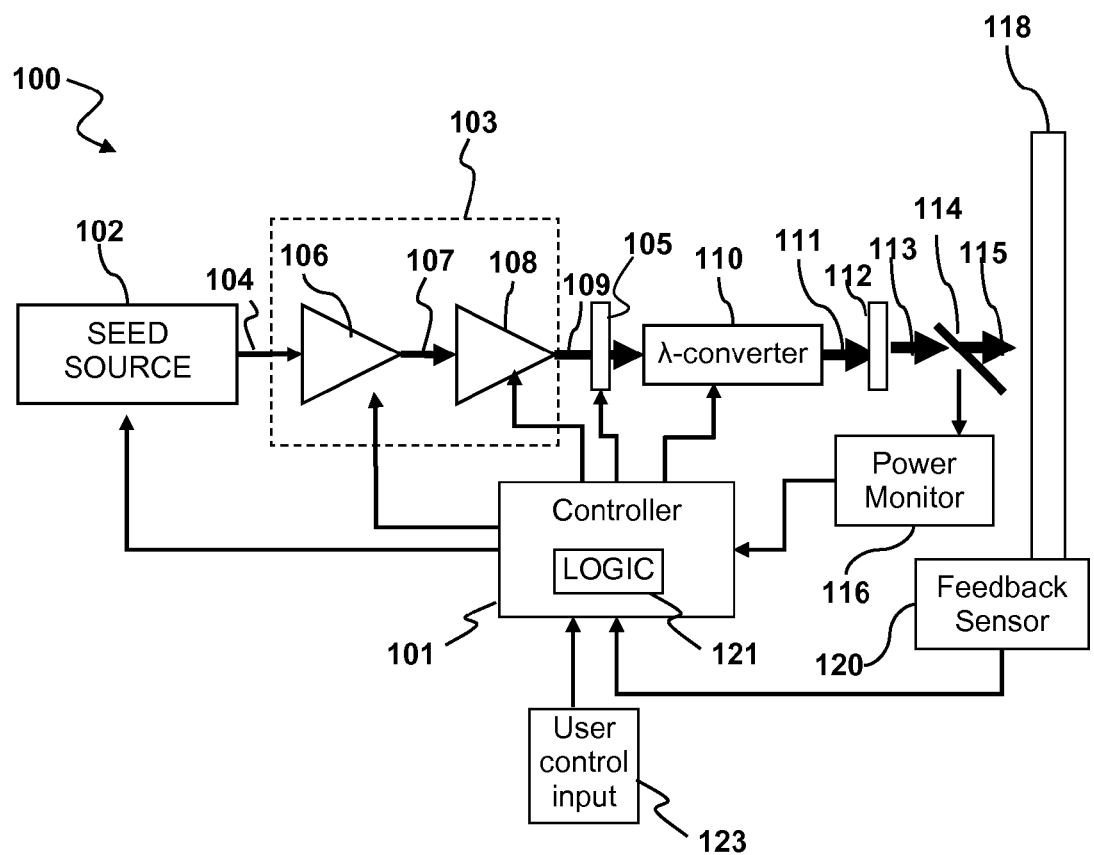
FIG. 1 is a schematic diagram of an apparatus according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

GLOSSARY

As used herein:

The indefinite article "A", or "An" refers to a quantity of one or more of the item following the article, except where expressly stated otherwise.

Beam splitter refers to an optical device capable of splitting a beam of light into two or more parts.

Brillouin scattering refers to a nonlinear optical phenomenon involving spontaneous scattering of light in a medium due to interaction between the light and sound waves passing through the medium.

Cavity or Optically Resonant Cavity refers to an optical path defined by two or more reflecting surfaces along which light can reciprocate or circulate. Objects that intersect the optical path are said to be within the cavity.

Chirping refers to a rapid change as opposed to a long-term drift in the emission wavelength of an optical source.

Continuous wave (CW) laser refers to a laser that emits radiation continuously rather than in short bursts, as in a pulsed laser.

Duty Cycle (D) refers to the product of the pulse duration r and the pulse repetition frequency (PRF) for pulses that occur at regular intervals. The duty cycle may be expressed as a ratio, for example, 0.01 or equivalently may be expressed as a percentage, for example 1%.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through an amplifier.

Gain Medium refers to a lasable material as described below with respect to a Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and similar.

Includes, including, e.g., "such as", "for example", etc., "and the like" may, can, could and other similar qualifiers used in conjunction with an item or list of items in a particular category means that the category contains the item or items listed but is not limited to those items.

Infrared Radiation refers to electromagnetic radiation characterized by a vacuum wavelength between about 700 nanometers (nm) and about 100,000 nm.

Laser is an acronym of light amplification by stimulated emission of radiation. A laser is a cavity that is contains a lasable material. This is any material—crystal, glass, liquid, semiconductor, dye or gas—the atoms of which are capable of being excited to a metastable state by pumping e.g., by light or an electric discharge. Light is emitted from the metastable state by an atom as it drops back to the ground state. The light emission is stimulated by the presence by a passing photon, which causes the emitted photon to have the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Mode-Locked Laser refers to a laser that functions by controlling the relative phase (sometimes through modulation with respect to time) of each mode internally to give rise selectively to energy bursts of high peak power and short duration, e.g., in the picosecond ($10^{-12}$ second) domain.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since the two values are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like. Optical fiber can also be induced to have a non-linear response to optical radiation by fabricating microstructures in the fiber.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multiwave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Duration ($\tau$) refers to the temporal duration or lifetime of a repetitive signal, e.g., the time interval between the half-power points on the leading and trailing edges of the pulse. Pulse duration is sometimes referred to as "pulse width".

Pulse Energy refers to the amount of energy in a pulse. Pulse energy may be calculated by integrating instantaneous pulse power over the pulse period.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as ($2\pi$)×(average energy stored in the resonator)/(energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with acousto-optic or electro-optic modulators or saturable absorbers, a giant pulse is generated.

Quasi-CW refers to generating a succession of pulses at a high enough repetition rate to appear continuous.

Quasi Phase-matched (QPM) Material: In a quasi-phase-matched material, the fundamental and higher harmonic radiation are phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Raman Scattering refers to a scattering of incident light by matter in which the scattered light has a lower frequency than the incident light. The difference between the frequencies of the incident and scattered light (referred to as the Raman shift) corresponds to a natural vibrational frequency of the scattering material.

Saturation of an optical amplifier refers to a decrease of the gain coefficient of a medium near some transition frequency when the power of the incident radiation near that frequency exceeds a certain value. If the gain coefficient is constant, the power emitted by the medium is proportional to the incident power. However, there is typically a limit to the rate at which a gain medium can emit power. This limit depends on the lifetimes of the energy levels involved. As this limit is reached, the stimulated transitions become rapid enough to significantly lower the upper energy level population, thereby decreasing the gain coefficient. The effect is to "flatten" the amplified power as a function of input power.

Stimulated Brillouin Scattering refers to a type of amplification process in which intense light causes deformation of a crystal lattice that generates ultrasonic waves in the lattice.

Stimulated Raman Scattering (SRS) is a type of Raman scattering that can occur with an intense optical beam. The Raman-scattered light experiences gain and its power increases exponentially. If the power of the incident light exceeds a threshold value, a large portion of the incident light is converted to Raman-scattered light having a lower frequency than the incident light. SRS is also sometimes known as the stimulated Raman effect or coherent Raman effect.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Saturation Intensity ($I_{sat}$): The intensity which reduces the gain of an amplifier to half of its small-signal value. An amplifier is said to be saturated if the signal intensity passing through the amplifier is significantly larger than the saturation intensity.

DESCRIPTION

In typical nonlinear optical wavelength conversion processes, fundamental radiation characterized by an optical frequency $\omega 1$ is converted to wavelength-converted output radiation characterized by an optical frequency $\omega 2$. The wavelength-conversion efficiency $\eta$ measures the ratio of average power of the wavelength-converted to fundamental radiation, i.e., $P^{\omega 2}_{avg}/P^{\omega 1}_{avg}$. Precise control of wavelength converted average power $P^{\omega 2}_{avg}$ is often required for many laser applications. Specific examples of laser applications requiring long bursts of pulses and quasi-cw operation include, e.g., micro-machining, wafer scribing, wafer dicing and welding. In particular, welding applications often require high initial power to penetrate a surface to initiate a weld followed by a rapid reduction in power to continue the weld. This is sometimes referred to as maintaining the weld pool or puddle and is particularly important for keyhole welding. Other laser applications requiring precise control of wavelength-converted average power include medical cosmetic treatments.

Additional precision laser applications often require precise control of wavelength converted pulse energy. Such applications include, but are not limited to link blowing, microbiology applications such as perforation of a cell membrane, and hole or via drilling. In the particular case of hole or via drilling it is sometimes desirable to penetrate different material layers. Each material layer may require different pulse characteristics. In addition, it is sometimes necessary to stop the drilling at a certain layer. To do this it is useful to reduce the pulse energy as the hole depth approaches the stop point. Many processes, such as link blowing, require a minimum pulse energy to induce the desired material effect. Pulse energies below this threshold have no effect on the material. For these applications, the wavelength converted power does not need to be completely off between pulses.

Although techniques exist for varying the wavelength-converted average power, such techniques are subject to limitations. For example, CW diode-pumped solid state or fiber lasers may use a shutter to modulate the wavelength-converted average power by modulating the average fundamental power $P^{\omega 1}_{avg}$. Unfortunately, the use of a shutter is often too slow for certain applications. Where the laser system includes a laser diode, it is possible to modulate the average power output of the radiation from the laser through high-speed modulation of the current that provides pumping energy to the laser diode. Unfortunately, such high-speed modulation of high-power laser diodes may be undesirable for several reasons. First, high speed modulation may reduce diode lifetime because of fatigue from the repeated large and rapid thermal cycles. In addition, electrical circuitry used to drive large current transients is often cumbersome and expensive. Furthermore, the modulation rate and depth of modulation are typically limited by such factors as cavity lifetime and upper state lifetime. This limits the peak powers obtained through such modulation techniques resulting in inefficient wavelength conversion. Furthermore, for diode-pumped solid state lasers, the output mode spatial characteristics typically depend on the average power. Thus, modulating the average power can adversely affect the output mode spatial characteristics.

Alternatively, average fundamental power may be modulated in pulsed, flashlamp-pumped lasers by varying the power of the flashlamp pulses used to pump the gain medium. Unfortunately, the repetition rate of flashlamp pumping is typically too low and not quasi-CW, precluding their use in applications demanding high pulse repetition rates. In addition, flashlamp pulse energy is generally not consistent on a shot-to-shot basis, making average power and pulse energy control for flashlamp pumping imprecise.

To overcome these disadvantages embodiments of the present invention control wavelength-converted average power $P^{\omega 2}_{avg}$ in a pulsed light source principally by changing wavelength conversion efficiency $\eta$ as opposed to significantly changing average fundamental power.

FIG. 1 depicts a wavelength-converted optical system 100 and method according to an embodiment of the present invention. Specifically, the system 100 generally includes a controller 101, a seed source 102, an optical amplifier 103 and a wavelength converter 110. The seed source 102 generates seed radiation 104, which is amplified by the amplifier 103 to produce an amplified output 109. The wavelength converter 110 wavelength converts at least a portion of the amplified output 109 to produce a wavelength converted output 111. A method for controlling an average power of the wavelength-converted output 111 from the wavelength converter 110 may be appreciated from the following discussion of the operation of the apparatus 100.

The seed source 102 generates the seed radiation 104 in the form of one or more seed pulses. The seed radiation 104 has an optical spectrum, which may be characterized by a fundamental frequency $\omega 1$ and a bandwidth or alternatively may be characterized as a distribution of discrete wavelengths each with its characteristic bandwidth. The spectral distribution may be substantially constant over the duration of the pulse, or may vary with time, e.g., may be chirped. Generally, the seed source 102 may include a laser and seed radiation 104 may be in the form of coherent light. Alternatively, seed source 102 may include an amplified spontaneous emission (ASE) source. The seed radiation 104 produced by the seed source 102 may be in the IR, visible, or UV ranges of the electromagnetic spectrum. For example, the seed radiation 104 may be characterized by a vacuum wavelength in a range from about 500 nm to about 2000 nm. Optical signals having wavelengths within this range may be obtained with a variety of different lasers, such as semiconductor lasers and fiber lasers.

The controller 101 may be operably coupled to the seed source 102 and/or amplifier 103 and/or wavelength converter 110. The controller includes logic 121 adapted to control the average wavelength-converted power ($P^{\omega 2}_{avg}$). Logic 121 can precisely control the average wavelength-converted power ($P^{\omega 2}_{avg}$) with a bandwidth similar to the pulse repetition frequency without adjusting average power ($P^{\omega 1}$) of the amplified output 109. Over a time scale comparable to the pulse period (T), the average power of the amplified output 109 may be substantially constant. The pulse period T may have any suitable value and may be adjusted by logic 121 on a pulse-to-pulse basis. By way of example, the pulse period T may be less than about 1 millisecond.

There are a number of different possible designs for the seed source 102. For example, the seed source 102 may be low power diode laser pumped by driving electric current through the diode. An example of a suitable commercially available, DBR type laser diode is a model DBR-1063-100 from Sacher Lasertechnik Group of Marburg, Germany. The seed radiation 104 may be pulsed by turning the current on and off. Alternatively, the seed radiation 104 may be pulsed by an optical modulator, such as an acousto-optic or electro-optic modulator. A particularly useful type of modulator is an integrated optic type Mach-Zender modulator fabricated on lithium niobate. Such modulators are commercially available as Model #MXPE-LN from Photline Inc. of Besancon, France. In addition, the seed radiation 104 may be chirped to avoid stimulated Brillouin scattering (SBS) in the amplifier 103. For a DBR type laser diode, chirping is achieved by slewing the voltage or current through either the gain, phase, or reflector section of the laser diode. The chirp rate may be as low as about 10 MHz/ns to greater than about 1 GHz/ns depending on the system. The chirp rate may be tuned to avoid SBS in the amplifier 103.

Figure 2:
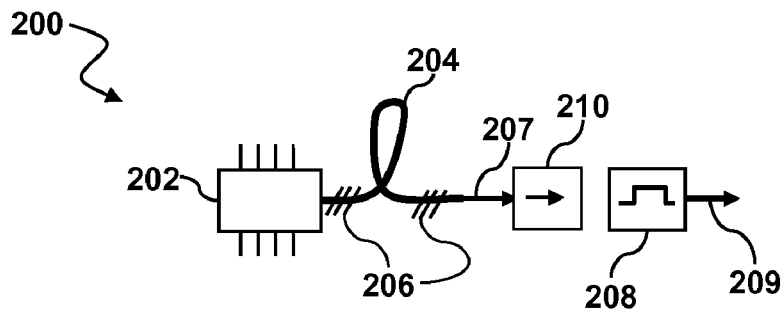
FIG. 2 is a schematic diagram of a seed source suitable for use with embodiments of the present invention.

FIG. 2 depicts an example of a fiber laser 200 that may be used as the seed source 102 of FIG. 1. The fiber laser 200 generally includes a pumping source 202 optically coupled to a fiber having a core that is doped with a suitable dopant. By way of example, and without loss of generality, the pumping source may be a diode laser. An example of a suitable pump laser diode is a Series 2900, 980 nm pump diode available from JDS Uniphase of Milpitas, Calif.

Pumping radiation from the pumping source 202 is coupled to the core of the fiber 204. The pumping radiation interacts with dopant atoms in the fiber core stimulating emission of radiation. Reflectors 206, e.g., Bragg gratings, at opposite ends of the fiber 204 reflect the stimulated radiation back and forth through the fiber 204, stimulating additional emission with each pass through the fiber 204. Some of the stimulated radiation 207 leaks out of the reflector 206 at one end as output. An optical modulator 208 may pulse the stimulated radiation to produce a pulsed output 209. By way of example, the optical modulator 208 may include an acousto-optic, magneto optic or electro-optic modulator. The modulator 208 may be operably coupled to the controller 101 to provide automatic control of the pulse repetition frequency and/or duty cycle of the pulsed output 209. An optical isolator 210 may be optically coupled between the fiber 204 and the modulator 208 to prevent radiation from undesirably entering the fiber 204 from its output end. Additionally, it may be desirable to include other elements adjacent to isolator 210, such as a spectral filter, optical modulator, or polarizer.

The vacuum wavelength of the stimulated radiation 207 is dependent on the choice of dopant and fiber material. Different dopant and fiber materials require different vacuum wavelengths of pumping radiation. By way of example a glass fiber doped with ytterbium (Yb) produces stimulated emission at a vacuum wavelength of about 0.98 to about 1.15 microns when pumped with radiation having a vacuum wavelength of about 976 nanometers.

Alternatively, the seed source 102 may be a diode-pumped solid state (DPSS) laser, which may be passively Q-switched, mode-locked or run continuous wave (CW). An example of a passive Q-switched micro laser is a Microchip micro laser available from Teem Photonics of Wellesley, Mass. An example of a suitable mode-locked laser is a Lynx laser available from Time-Bandwidth Products Inc. of Zurich, Switzerland. An example of a suitable CW DPSS laser is a model 125 non-planar ring oscillator (NPRO) laser available from JDS Uniphase of Milpitas, Calif.

Alternatively, the seed source 102 may be a laser diode. Various types of laser diodes, such as a distributed Bragg reflector (DBR) laser, distributed feedback (DFB), or Fabry-Perot laser diode may be used. An example of a commercially available DBR is a model DBR-1064-100 from Sacher Lasertechnik Group of Marburg, Germany. This particular distributed Bragg reflector laser diode produces emission at a vacuum wavelength of 1064 nm with 100 mW output power.

Alternatively the seed source 102 could be an ASE source, such as a laser diode operating below threshold, a semiconductor amplifier, a tapered semiconductor amplifier, or a fiber amplifier. An example of a commercially available ASE source that may be used as the seed source 102 is an ASE Narrowband Source, available from Multiwave Photonics, S.A., of Moreira de Maia, Portugal. The output of any CW source, such as a DPSS, DBR laser diode, or ASE source, may be modulated using an external optical modulator. Like the laser diode, the ASE source may produce pulsed seed radiation 104 by pulsing the current used to pump the ASE or by passing the seed radiation through an optical modulator. ASE sources typically produce seed radiation 104 having a sufficiently broad optical spectrum to avoid SBS in the optical amplifier 103 (e.g., greater than about 10 GHz). As such, seed radiation 104 from an ASE source may not require chirping to avoid SBS in the optical amplifier 103. Furthermore, the spectral bandwidth of an ASE source may be narrower than the spectral bandwidth of the non-linear wavelength conversion element to maintain high wavelength conversion efficiency.

For diode laser, diode pumped fiber lasers, diode pumped solid state lasers and ASE sources, the user may have complete and accurate control of the pulse repetition frequency (PRF) and/or duty cycle. Specifically, the pulse repetition frequency may be controlled by control of an optical modulator or though control of a diode current in response to signals from the controller 101.

In alternative embodiments of the invention the seed source 102 could take one of many forms. The maximum pulse period is limited only by the upper state lifetime of the amplifier gain material. The pulse periods can range from milliseconds to femtoseconds. The pulses may be repeated at any repetition rate suitable for the pulse width. The pulse shape need not have a top hat profile, but may have a Gaussian, sawtooth, short high-power leading edge, or any arbitrary pulse shape. The pulse format may be any suitable pulse format, such as intermittent bursts of pulses.

In addition, the seed radiation 104 from the seed source 102 may include high duty cycle, low-amplitude pulses combined with low duty cycle relatively high-amplitude pulses. The pulse shape of the seed radiation 104 may be pre-distorted to compensate for pulse distortion that may occur in the optical amplifier 103. It is noted that unless the seed radiation 104 and amplified output 109 have a substantially square pulse shape with zero emission between peaks, the wavelength-converted output 111 may typically be distorted relative to the seed radiation 104. This stems from the variation in wavelength-conversion efficiency $\eta$ with peak power. Furthermore it is noted that in addition to the wavelength-converted output 111 an overall output radiation from the wavelength converter 110 may include unconverted fundamental radiation, and/or Raman-shifted radiation.

The seed radiation 104 is optically coupled to the optical amplifier 103, which amplifies the seed radiation 104 thereby producing an amplified signal 109 in the form of one or more amplified pulses. The optical amplifier 103 may include one or more amplifier units. For example, the optical amplifier 103 may include one or more optional pre-amplifiers 106 optically coupled in series between the seed source 102 and a power amplifier 108. The pre-amplifier(s) 106 may amplify the seed radiation 104 thereby producing an intermediate signal 107, which is amplified by the power amplifier 108 to produce the amplified output 109.

Figure 3:
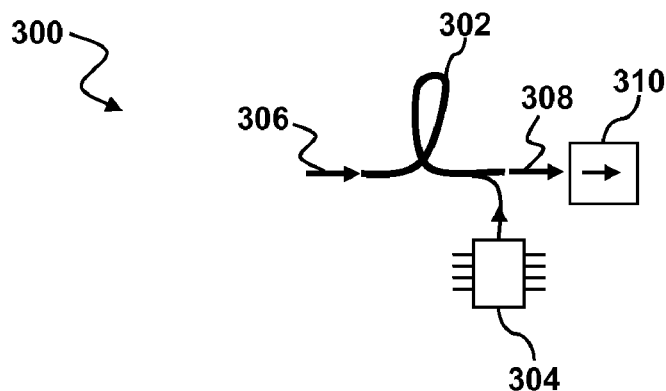
FIG. 3 is a schematic diagram of a fiber amplifier suitable for use as a pre-amplifier in embodiments of the present invention.

As noted above, the optical amplifier 103 may include one or more pre-amplifiers 106 and a power amplifier 108. A number of different designs may be used for the pre-amplifier (s) 106 and power amplifier 108. By way of example and without loss of generality the pre-amplifier(s) 106 and/or power amplifier 108 may be fiber amplifiers. FIG. 3 depicts an example of a fiber pre-amplifier 300 having an optical fiber 302 and a pumping source 304. The optical fiber 302 includes cladding and a doped core. The core of the fiber 302 may be, e.g., about 6 microns in diameter. It is also desirable that fiber 302 be a polarization maintaining or single polarization fiber. Input radiation 306 that is to be amplified is coupled to the core. Pumping radiation from the pumping source 304 is also typically coupled to the core, but may alternatively be coupled to the cladding. By way of example, the input radiation 306 may originate from a seed source. Dopant atoms, e.g., rare earth elements such as ytterbium (Yb), erbium (Er), neodymium (Nd), holmium (Ho) samarium (Sm) and thulium (Tm), or combinations of two or more of these, in the core of the fiber 302 absorb energy from the pumping radiation. Those of skill in the art will be familiar with rare-earth-doped fiber amplifiers (REDFA) schemes and architectures.

The input radiation 306 stimulates emission of radiation from the dopant atoms. The stimulated radiation has the same frequency and phase as the input radiation. The result is an amplified output 308 having the same frequency and phase as the input radiation but a greater optical intensity. An optical isolator 310 may be optically coupled to an output end of the fiber 302 to prevent radiation from undesirably entering the fiber 302 from its output end, e.g., as a result of reflection. Additionally, it may be desirable to include other elements adjacent to isolator 310, such as a spectral filter, optical modulator, or polarizer. In alternative embodiments of the invention, the pre-amplifier may be omitted, included or upgraded as required to achieve the appropriate optical power required for the wavelength converter 110.

Figure 4:
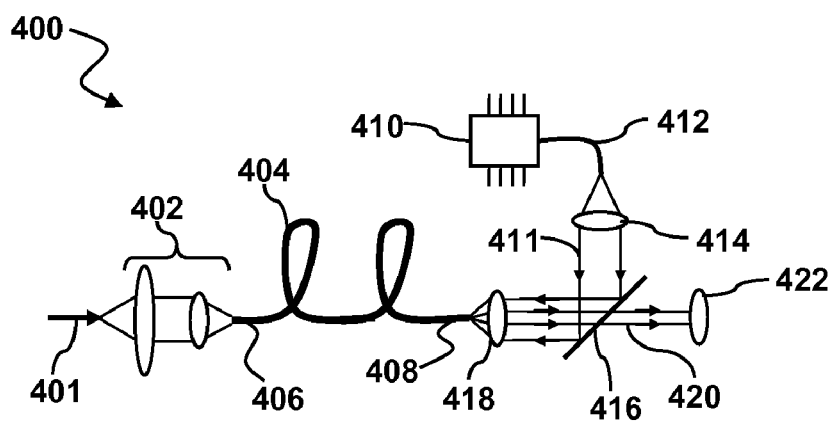
FIG. 4 is a schematic diagram of a fiber amplifier suitable for use as a power amplifier in embodiments of the present invention.

FIG. 4 depicts one possible example, among others, of a fiber power amplifier 400 that may be used in the optical amplifier 103. The fiber power amplifier 400 generally receives an optical signal 401 that is to be amplified. The optical signal 401 may originate from a seed source and may be pre-amplified between the seed source and the fiber power amplifier 400. An optical coupler 402, e.g., having a pair of relay lenses, may couple the optical signal 401 into an optical fiber 404 at a first end 406. Preferably, the fiber 404 is long enough that it absorbs a sufficient percentage of the pumping radiation (e.g., about 90% or more). It is desirable for the fiber 404 to have a core diameter suitable for a large mode area (LMA) fiber. It is further desirable that fiber 404 be dual clad, with an inner cladding diameter and acceptance angle suitable for accepting high-power, multi-mode pump radiation. It is also desirable that fiber 404 be a polarization maintaining or single polarization fiber. By way of example, the fiber 404 may be a Nufern Dual Clad Active fiber with LMA core, e.g., part numbers LMA-EYDF-25/300 or LMA-TDF-25/250 available from Nufern of East Granby, Connecticut or Model DC-200-41-PZ-Yb available from Crystal Fibre A/S of Birkerød, Denmark. By way of example, the core of the fiber 404 may be doped with a rare earth element, such as erbium (Er), ytterbium (Yb) or neodymium (Nd).

A pumping source 410 supplies pumping radiation 411 to the fiber 404 at a second end 408. The pumping source 410 typically contains one or more high power laser diodes. These laser diodes can be either in the form of a single-emitter or a monolithic bar, containing multiple single emitters. Specific examples of suitable commercially available laser diodes include a model LIMO110-F400-DL980 laser diode, from Lissotschenko Mikrooptik (LIMO) GmBH of Dortmund, Germany and an Apollo F400-980-4 laser diode from Apollo Instruments of Irvine, Calif. Alternatively, the pumping source 410 may be an array of single emitters optically coupled together, for example an array of model L3 980 nm pump package available from JDS Uniphase of Milpitas, Calif.

Preferably, the source 410 is a multimode source and the fiber 404 has a multi-mode inner cladding. In the power amplifier 400, the pumping radiation is typically coupled to the inner cladding of the fiber 404. If the pumping radiation 411 is single-mode, then the pumping radiation 411 may alternatively be coupled directly to the core of the fiber 404. By way of example, a fiber 412 may couple the pumping radiation 411 from the pumping source 410 to a collimator lens 414. The pumping radiation 411 may be coupled to either end of the fiber 404 or to both ends. In some embodiments it is advantageous to situate the pumping source 410 proximal to the seed source 102, and connect the pumping source 410 via the fiber 412, which may be a multi-mode fiber. Such an arrangement may reduce the size and the heat load.

The pumping radiation 411 emerges from the fiber 412 as a divergent beam. The collimator lens 414 focuses the divergent beam into a collimated beam. A wavelength-selective reflector 416 (e.g., a dichroic filter) reflects the pumping radiation toward a converging lens 418, which focuses the collimated pumping radiation into the second end 408 of the fiber 404. Dopant atoms in the core of the fiber 404 absorb the pumping radiation 411 stimulating emission of amplified output radiation 420 having the same frequency and phase as the optical signal 401 but with an amplified optical intensity. Amplified output radiation 420 diverges as it emerges from the second end 408 of the fiber 404. The wavelength-selective reflector 416 is configured to transmit the amplified output radiation 420. By way of example, the frequency selective filter 416 may be a dichroic filter having a stop band selected to reflect radiation in the frequency range of the pumping radiation 411 (e.g., about 976 nanometers) and a passband selected to transmit radiation in the frequency range of the amplified output radiation 420 (e.g., about 1.06 microns). The amplified output radiation 420 may then be focused by an output coupler lens 422.

Although the preceding discussion details fiber amplifiers that may be used as pre-amplifiers or power amplifiers, other optical amplifier designs may be used. As an alternative to fiber implementations, the amplifier 400 may use a slab-type gain medium, e.g., a doped crystal such as neodymium-doped yttrium orthovanadate ($Nd:YVO_4$), neodymium-doped yttrium aluminum garnet (Nd:YAG), or a ceramic gain medium such as sintered Nd:YAG or a semiconductor-based gain medium. Such slab-type gain media may be side-pumped or end-pumped. Gain media with rod-type configurations may also be used in the amplifier 400.

The amplified output 109 from the optical amplifier 103 is optically coupled to the wavelength converter 110. In some embodiments of the invention, the system 100 may include coupling optics 105 that receive the amplified output 109 from the optical amplifier 103 and transmit it to the wavelength converter 105. The coupling optics 105 may be in the form of simple windows. Alternatively, the coupling optics 105 may include lenses having focal lengths and positions selected to collimate or focus the amplified output 109 into the wavelength converter 110. The coupling optics 105 may alternatively be configured to modify the temporal characteristics of the amplified output 109. In some embodiments, the coupling optics 105 may include pulse-compression (or stretcher) schemes. This type of coupling optics may be particularly useful with picosecond or femtosecond type pulsed outputs to avoid undesired optical nonlinearities. Alternatively, the coupling optics 105 may include some means to affect the amplified output 109, e.g., its pulse repetition frequency (PRF). For example, the coupling optics 105 may include an optical shutter that allows a user to selectively block all or some of amplified output 109. Alternatively, the coupling optics 105 may include a pulse picker to reduce the PRF of the amplified output 109.

From the amplified output 109, the wavelength converter 110 produces a wavelength converted output 111, which may be in the form of one or more wavelength-converted pulses. The wavelength-converted output 111 may be characterized by vacuum wavelengths in the infrared (IR), visible, or ultraviolet (UV) ranges of the electromagnetic spectrum depending on the optical spectrum of the amplified output 109 and the nature of the wavelength conversion taking place in the wavelength converter 110. The optical wavelength converter 110 may produce the wavelength-converted output 111 characterized by an optical frequency ω2 from the amplified output 109 by one or more non-linear optical wavelength conversion processes. Examples of such process include, but are not limited to, e.g., second-, third-, and fourth-harmonic generation, higher harmonic generation, optical parametric oscillation, sum frequency generation, difference frequency generation, optical parametric amplification, optical parametric oscillation and the stimulated Raman effect. Such processes may be implemented using non-linear optical materials that are phase matched to produce the desired wavelength conversion effect. It is noted that although optical amplifier 103 and wavelength converter 110 are shown as separate components, this is not meant to preclude the possibility that the amplification and wavelength conversion functions may be implemented in a single component.

The wavelength converter 110 may produce the wavelength converted output 111 through one or more non-linear processes. Any non-linear process may be implemented. By way of example, the non-linear process may be a $\chi^2$ nonlinear interaction or a $\chi^3$ process. Examples of $\chi^2$ nonlinear interactions include second harmonic generation, third harmonic generation, fourth harmonic generation, optical parametric oscillation, and generation of sum or difference frequencies between frequencies of the seed pulses and/or one or more harmonics. Combinations of two or more such processes may also take place in the wavelength converter 111. Examples of $\chi^3$ process include Raman scattering, Brillouin scattering, and self-phase modulation.

Figure 5:
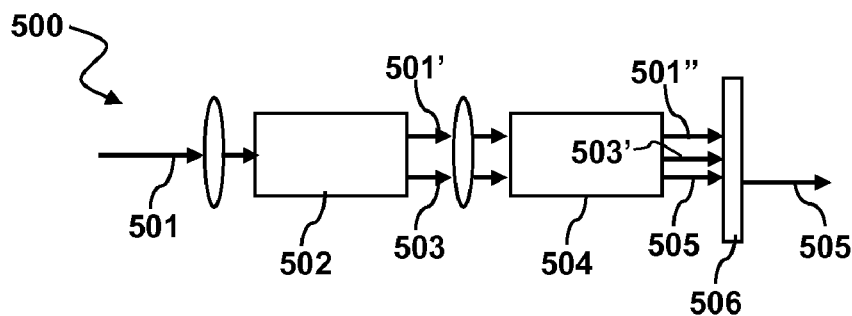
FIG. 5 is a schematic diagram of a third harmonic generator suitable for use as a wavelength converter in embodiments of the present invention.

Embodiments of the present invention may use any suitable wavelength converter. FIG. 5 depicts one example, among others, of a wavelength converter 500 that may be used in the system 100 depicted in FIG. 1. In this example, the wavelength converter 500 is a third-harmonic generator. The wavelength converter 500 generally includes first and second non-linear crystals 502, 504. Examples of suitable non-linear crystals of include lithium niobate ($LiNbO_3$), lithium triborate (LBO), beta-barium borate (BBO), cesium lithium borate (CLBO), lithium tantalite, stoichiometric lithium tantalite (SLT) potassium titanyl phosphate ($KTiOPO_4$ also known as KTP), ADA, ADP, CBO, DADA, DADP, DKDP, DLAP, DRDP, KABO, KDA, KDP, LB4, or LFM and isomorphs thereof, periodically poled materials such as periodically poled lithium niobate (PPLN), periodically poled lithium tantalate and periodically poled stoichiometric lithium tantalite (PPSLT). Such non-linear materials are available commercially, e.g., from Fujian Castech Crystals of Fujian, China. In addition, nonlinear fiber may be used for wavelength conversion. Wavelength converter 500 is operably connected to controller 101. By way of example, logic 121 in controller 101 may control devices that adjust temperature, strain, position, angular orientation or electric field in one or both of the of first and second non-linear crystals, 502 and 504, to maximize, control, and/or stabilize the wavelength conversion efficiency.

The first non-linear crystal 502 receives amplified input radiation 501 from a power amplifier. The input radiation 501 is characterized by an optical frequency ω. The first non-linear crystal 502 is phase-matched for second harmonic generation. Phase-matching may be controlled by adjusting a temperature of the first non-linear crystal. Specifically, a portion of the input radiation 501 reacts in the non-linear crystal 502 to produce second-harmonic radiation 503, which is characterized by an optical frequency 2ω. The second harmonic radiation 502 and a remaining portion 501' of the input radiation 501 couple to the second non-linear crystal 504. The second non-linear crystal 504 is phase-matched for sum frequency generation between radiation of optical frequency 2ω and radiation of optical frequency ω. Specifically, in the second non-linear crystal 504, the second harmonic radiation 503 and the remaining portion 501' of the input radiation 501 interact in the second non-linear crystal 504 to produce third-harmonic radiation 505 characterized by optical frequency 3ω. The third harmonic radiation 505 exits the second non-linear crystal 504 to provide the frequency-converted output.

If the conversion efficiency of the second non-linear crystal is less than 100% some left-over portion 501" of the input radiation 501 may also exit the second non-linear crystal 504. The wavelength converter 500 may include an optical filter 506 (e.g., a dichroic filter) that reflects the left-over portion 501" and a left-over portion 503' of the second-harmonic radiation 503 while transmitting the third harmonic radiation 505. The left-over portions 501", 503' may be directed to an optical trap or otherwise disposed of as waste light. Alternatively optical filter 506 can be configured to selectively pass more than one output wavelength, e.g., the third harmonic radiation 505, the leftover second harmonic radiation 503', and the leftover fundamental radiation 501".

By way of example, the first crystal 502 may double the frequency of 1.04 micron to 1.08 micron wavelength input radiation 501 to produce second harmonic radiation 503 having a vacuum wavelength of about 520 nm to about 540 nm. The second non-linear crystal 504 sums the second harmonic radiation 503 with the remaining portion of the input radiation 501' to produce third harmonic radiation 505 having a vacuum wavelength ranging from about 340 nm to about 360 nm. By way of example, and without loss of generality, the first crystal 502 may double 1.064-micron input radiation 501 to generate 532 nm second-harmonic radiation 503. The second crystal sums the remaining portion of the input radiation 501' with the second-harmonic radiation 503 to produce 355 nm third-harmonic radiation 505. It is noted that although FIG. 5 depicts an example of a third-harmonic generator, those of skill in the art will recognize that other non-linear wavelength converters, such as second-harmonic generators, fourth harmonic generators, other higher harmonic generators, sum-frequency generators, difference-frequency generators, optical parametric oscillators, optical parametric amplifiers, and the like can be used. For example the wavelength converter 500 may be configured as a second harmonic generator if the second non-linear crystal 504 is omitted.

The system 100 may also include coupling optics 112 that receive the wavelength-converted output 111 and transmit a final output 113. The coupling optics 112 may include simple windows and may also include an optical fiber. Alternatively, the coupling optics 112 may include lenses having focal lengths and positions selected to collimate or focus the wavelength-converted output 111 as a final output 113. The coupling optics 112 may alternatively be configured to modify the temporal characteristics of the final output 113. In some embodiments, the coupling optics 112 may include pulse-compression (or stretcher) schemes. This type of coupling optics may be particularly useful with picosecond or femtosecond type pulsed outputs to avoid optical nonlinearities just prior to beam delivery. Alternatively, the coupling optics 112 may include some means to affect, e.g., a pulse repetition frequency (PRF), the final output 113. For example, the coupling optics 112 may include an optical shutter that allows a user to selectively block all or some of the final output 113. Alternatively, the coupling optics 112 may include a pulse picker to reduce the PRF of the final output 113.

The controller 101 may adjust the wavelength-converted average power in response to user control inputs 123. In some embodiments, the system controller 101 may operate in response to one or more feedback signals. For example, a portion of the final output 113 may be deflected, e.g., by a beamsplitter 114 to a power monitor 116. A remaining portion 115 may be directed to a target 118. Alternatively, the order of beamsplitter 114 and coupling optics 112 can be reversed and the system will still function in a similar manner. The power monitor 116 may be operably coupled in a control loop to the controller 101. Alternatively, a sensor 120 at or proximate the target 118 may be coupled to the controller 101 in a control loop to provide a feedback signal. The sensor 120 may be any suitable sensor that measures and/or detects changes in a relevant property of the target 118 that can be influenced by interaction between the remaining output 115 and the target 118. Examples of relevant properties include, but are not limited to reflectance, transmittance, temperature, spectral emission, fluorescence, absorption, acoustic properties, and electrical resistivity. Feedback signals from the power monitor 116 and/or sensor 120 may be dependent on the average power or pulse energy of the final output 113 and/or remaining output 115. The controller 101 may adjust the components of the system 100, e.g., the seed source 102, pre-amplifier 106, power amplifier 108, coupling optics 105, 112 to vary the wavelength conversion efficiency η of the wavelength converter 110 in a way that produces a desired average wavelength converted power or pulse energy in the remaining output 115.

The control algorithm used by the controller 101 may have many forms. For instance, a feed-forward loop based on a signal from the power monitor 116 can be implemented. If the controller 101 notices that the last wavelength converted pulse energy is larger than anticipated, the feed-forward loop can slightly increase the pulsed width while maintaining a constant pulse repetition frequency. This will reduce the wavelength conversion efficiency and would serve to increase average power stability by attempting to keep pulse output energy constant. This is just one of many modes of possible control loops.

The remaining output 115 may be delivered to any of a number of different types of targets to implement any of a number of different types of processes depending on the application. Applications include, but are not limited to, material processing, medical treatments, laser particle accelerators, and wafer inspection. Examples of suitable targets include, but are not limited to, metals, ceramics, semiconductors, polymers, composites, thin films, organic materials, in vitro or in vivo biological samples, and elementary particles. In the particular case of material processing, targets may include, e.g., wires, printed circuit (PC) boards, integrated circuit (IC) packages, IC wafers dies, LED wafers, packages, dies and the like. Examples of material processing applications include surface texturing, heat treatment, surface engraving, fine micro-machining, surface ablation, cutting, grooving, bump forming, coating, soldering, brazing, sintering, sealing, welding, link blowing, wafer scribing, dicing and marking, via drilling, memory repair, flat panel display repair, stereolithography, maskless lithography, surface diffusion and surface conversion to a compound.

As described above, the average power $P^{\omega 2}_{avg}$ of the wavelength converted output 111 depends on the average power $P^{\omega 1}_{avg}$ of the amplified output 109 and the conversion efficiency η of the wavelength converter 110. The wavelength conversion efficiency generally depends on the exact nonlinear process taking place in the wavelength converter 110, the nonlinear materials used and the system geometry, e.g., the length of the nonlinear elements, and the focusing of fundamental radiation (e.g., amplified output 109) into the nonlinear elements. The wavelength conversion efficiency η generally depends on the peak power $P_{pk}$ of the pulses making up the amplified output 109, the wavelength λ of the amplified output 109 and the polarization Π of the amplified output 109. Thus, the wavelength-converted output power may be expressed as:

$$P^{\omega}_{avg} = P^{\omega 1}_{avg} * \eta(P_{pk}, \lambda, \Pi) = P^{\omega 1}_{avg} * \eta_{P_{pk}}(P_{pk}) * \eta_{\lambda}(\lambda) * \eta_{\Pi}(\Pi)$$

Eq. 1

The peak power ($P_{pk}$), wavelength ($\lambda$), and polarization ($\Pi$) may be controlled over a time scale comparable to that of a pulse period T of the pulses making up the seed source signal 104. In particular the controller 101 may control appropriate properties of the seed source 102 and/or optical amplifier 103 and/or other components of the system 100 to affect $P_{pk}$ and/or $\lambda$ and/or $\Pi$ in such a way as to vary the average wavelength-converted output power $P^{\omega 2}$ on a time scale comparable to the pulse period T.

Functional Dependence of $\eta_{Ppk}$ on Peak Power, $P_{pk}$

The fundamental peak power may be controlled by varying the duty cycle and/or pulse repetition rate of the seed source 102. Over a large operating window, the peak fundamental power monotonically increases with decreasing duty cycle D, and the peak fundamental power $P_{pk}$ monotonically increases with decreasing pulse repetition frequency. Details of the control of the fundamental peak power in the amplified output 109 may depend partly on whether the amplifier 103, or more particularly, the power amplifier 108, is saturated or unsaturated. Typical saturation power levels for the power amplifier 108 using a large mode area, Yb:glass fiber are about 300 mW. For saturated operation the output power of power amplifier 108 should at least three times this level, e.g., greater than about 1 W.

For a saturated amplifier, the average output power is approximately independent of the average input seed power, as long as the average input power is sufficient to saturate the amplifier. This is independent of the system duty cycle or pulse repetition frequency. As noted above, for saturated operation of the power amplifier 108, the wavelength-conversion efficiency $\eta$ may be approximated as a monotonically decreasing function of duty cycle D. The duty cycle D is defined as $D=\tau*PRF$, where $\tau$ is the pulse width and PRF is the pulse repetition frequency, 1/T. For saturated operation at a fixed PRF, as D goes up the peak power, $P_{pk}$, and conversion efficiency, $\eta$, go down and vice versa. Alternatively and equivalently one can vary $\tau$ or PRF and obtain similar precise control. By way of example, a signal from the controller 101 may control the duty cycle D, PRF or pulse duration $\tau$ by modulating the pumping of the seed source 102 or modulation of the seed radiation 104 through an acousto-optic or electro-optic modulator. Thus, the wavelength-converted average power $P^{\omega 2}_{avg}$ may be varied by varying duty cycle D, PRF or pulse duration $\tau$, while the average fundamental power $P^{\omega 1}_{avg}$ of the amplified output 109 remains nominally constant over a time scale comparable to the pulse period T. In particular, the drive current to the pump diodes energizing power amplifier 108 may be kept constant over a time scale comparable to the pulse period T.

The case of unsaturated operation of the power amplifier 108 is similar to that for saturated operation. It is possible to obtain an approximately constant average power of the amplified output 109 even when power amplifier 108 is not operating in the saturated regime. The average output power $P^{\omega 1}_{avg}$ is approximately constant as long as the average input signal to power amplifier 108 has approximately constant average power. The input signal power to the power amplifier 108 may refer to the average power of the seed radiation 104 from the seed source 102 or the pre-amplified output 107 from the pre-amplifier 106, if one is used. Constant average input power to the power amplifier 108 implies that the peak power of input signal to power amplifier 108 is inversely proportional to duty cycle. The peak output power of power amplifier 108 scales with peak input power independent of the amplifier saturation state. Thus one may control the wavelength converted average power of the system 100 as described above with an additional element of control of the average power of input to power amplifier. For example, the controller 101 may adjust the pump energy supplied to the seed source 102 and/or pre-amplifier 106 in such a way as to maintain a constant average power of the pre-amplified output 107.

For efficient operation of the power amplifier 108, it is desirable for the pulse period (T) to be less than the gain material's upper state lifetime. For example, for Yb:glass, the upper state lifetime is approximately 1 millisecond. Thus, the pulse period T would be less than about 1 millisecond, which implies a PRF of greater than about 1 KHz. Also for efficient operation, the emission spectrum of the seed radiation 104 from seed source 102 should be within the gain bandwidth of power amplifier 108. For example, the Yb:glass gain region when pumped at 976 nm extends from approximately 980 nm to 1150 nm. For efficient operation of the amplifier, seed radiation 104 should be within this spectral window.

Control of the wavelength-converted power through control of $P_{pk}$ may be understood with respect to a specific example, second harmonic generation in wavelength-converter 110 converting a 1064 nm fundamental wavelength to a 532 nm wavelength in lithium borate (LBO). The inventors have determined the following relationship between second harmonic conversion efficiency and peak power for LBO in practical lasers systems:

$$\eta_{Ppk}(P_{pk})=A* \tanh^2\{(P_{pk}/B)^{0.5}\} \qquad \text{Eq. 2}$$

Figure 6:
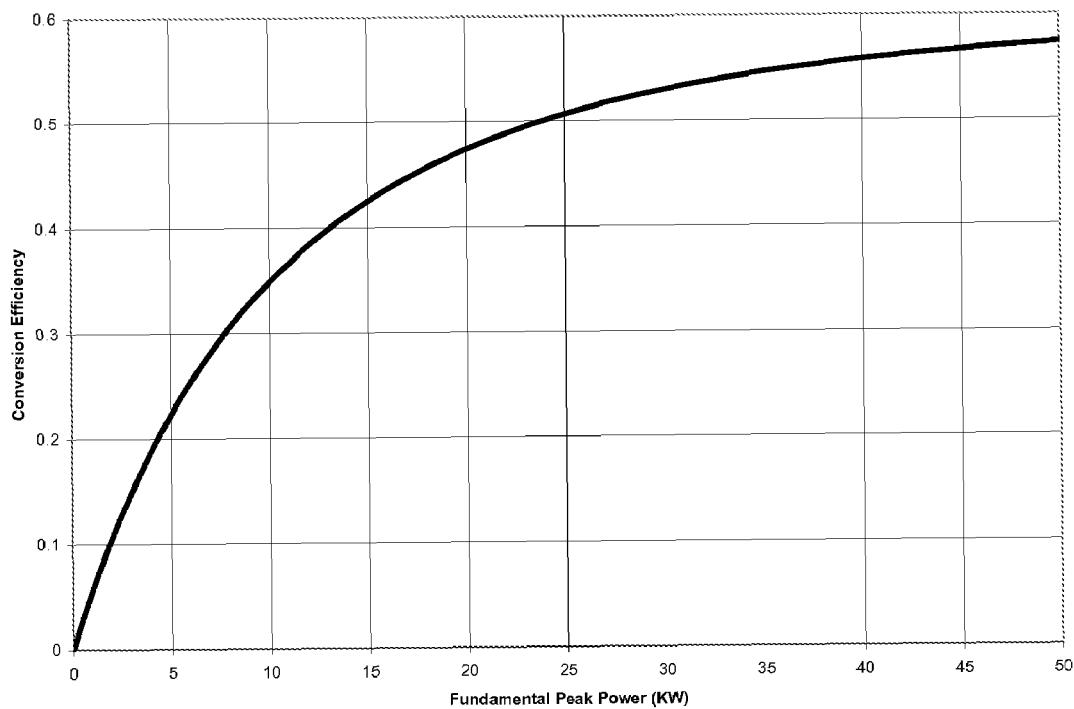
FIG. 6 is a graph illustrating conversion efficiency of an optical wavelength converter as a function of fundamental peak power.

In Eq. 2, A is an empirically determined constant having a value of about 0.6, B is an empirically determined constant that is dependent on the length of the LBO used in the wavelength converter 110. The constant B has a minimum value of about 5 KW. For illustrative purposes a value of B=10 KW may be used. FIG. 6 depicts a graph of the resulting relationship between conversion efficiency and fundamental peak power $P_{pk}$. Numerical results may be different for different situations, but all situations will share similar characteristics, the wavelength conversion efficiency will monotonically increase with increasing peak fundamental power over a large operating region.

Functional Dependence of $\eta_\lambda$ on Fundamental Wavelength ($\lambda$)

As noted above, wavelength-conversion efficiency varies with fundamental wavelength. Many wavelength-conversion materials have narrow spectral acceptance bandwidth. For many MOPA laser systems the gain in the amplifier 103 may be much broader than wavelength-conversion bandwidth of nonlinear element in the wavelength converter 110. The wavelength converted average power $P^{\omega 2}_{avg}$ may be controlled by varying the fraction of fundamental light in wavelength-conversion bandwidth of the wavelength converter 111. One possible way of doing this is to change the wavelength of seed radiation produced by the seed source. Alternatively, high peak power may cause stimulated Raman scattering (SRS) in the amplifier 103, which results in spreading of the spectrum of the fundamental radiation. Therefore, by controlling peak power as described above, e.g., by controlling pulse duty cycle or PRF, SRS may be triggered in the amplifier 103 resulting in a spreading of the spectrum.

Adjustment of wavelength conversion efficiency $\eta$ through control of the optical spectrum of the fundamental radiation enables wavelength-converted average power control with high bandwidth and precision.

For a narrow wavelength source the variation of relative conversion efficiency $\eta_\lambda$ as a function of fundamental wavelength may be expressed as:

$$\eta_\lambda(\lambda) = \{[(\sin(\pi^*(\lambda-\lambda_0)/\Delta\lambda)]/(\Delta\lambda/\pi)\}^2 \qquad \text{Eq. 3}$$

Figure 7:
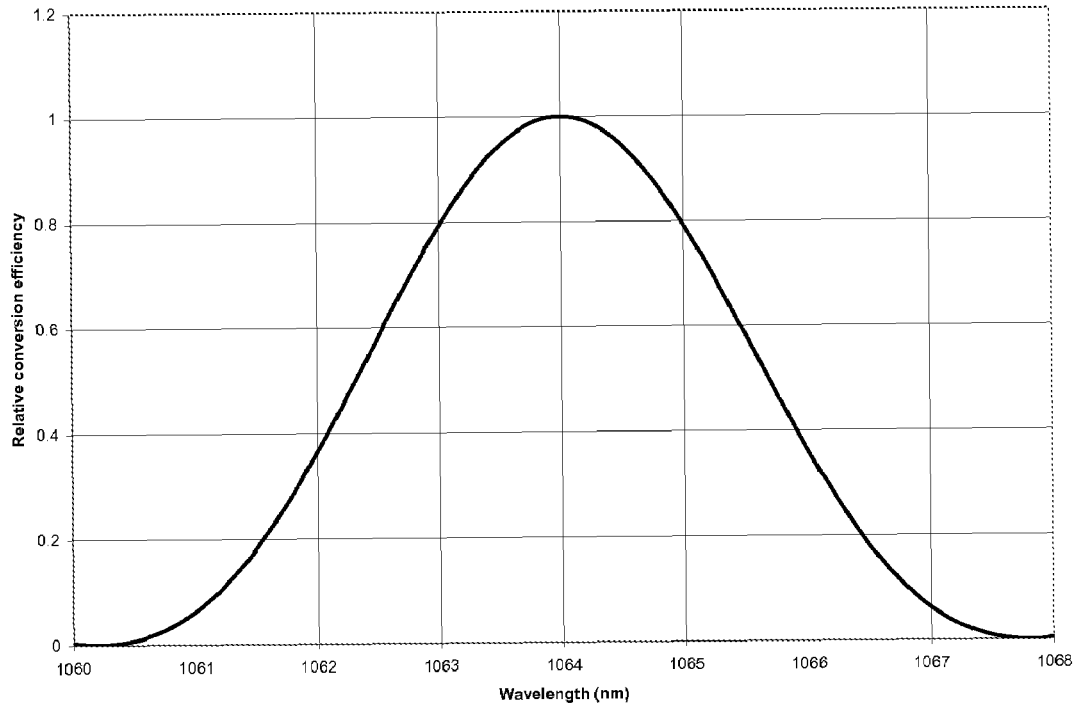
FIG. 7 is a graph illustrating conversion efficiency of an optical wavelength converter as a function of fundamental wavelength.

In Eq. 3, $\lambda$ is the fundamental wavelength, $\lambda_0$ is the wavelength for perfect phasematching in the nonlinear element used in the wavelength converter and $\Delta\lambda$ is the spectral acceptance bandwidth of the non-linear element. The spectral acceptance bandwidth $\Delta\lambda$ generally depends on the length of the non-linear element, the type of non-linear material being used and the nature of the wavelength conversion process. For example, for second harmonic generation in a 2 cm long LBO crystal with $\lambda_0$=1064 nm, the spectral bandwidth $\Delta\lambda$ is about 3.8 nm. Applying these values of $\lambda_0$ and $\Delta\lambda$ to Eq. 3 yields the graph depicted in FIG. 7.

It is noted that the seed radiation 104 and amplified output radiation 109 may be characterized by a single wavelength, multiple discrete wavelengths, or continuum of wavelengths. The relative spectral conversion efficiency may be determined by using Eq. 3 and integrating over all the wavelengths in the spectrum of the amplified output radiation 109.

Functional Dependence of Relative Polarization Efficiency $\eta_\Pi$ On Polarization $\Pi$ As noted above, the wavelength-conversion efficiency may vary with fundamental polarization. For type I conversion only one polarization state converts. For type II conversion both polarization states are needed for conversion. In either case the wavelength converted power may be adjusted by controlling the polarization state of the amplified output 109 entering the wavelength converter 110.

The relationship between the conversion efficiency $\eta$ and the polarization $\Pi$ depends partly on the type of non-linear process and phase matching taking place in the wavelength converter 110. By way of example, and without limitation, for second harmonic generation and type I phasematching, which has the highest nonlinearity for second harmonic generation of 1064 nm radiation in LBO conversion efficiency $\eta_\Pi(\Pi)$ may be expressed as $$\eta_\Pi(\Pi) = (\text{cosine}(\Pi))^2 \qquad \text{Eq. 4}$$

Figure 8:
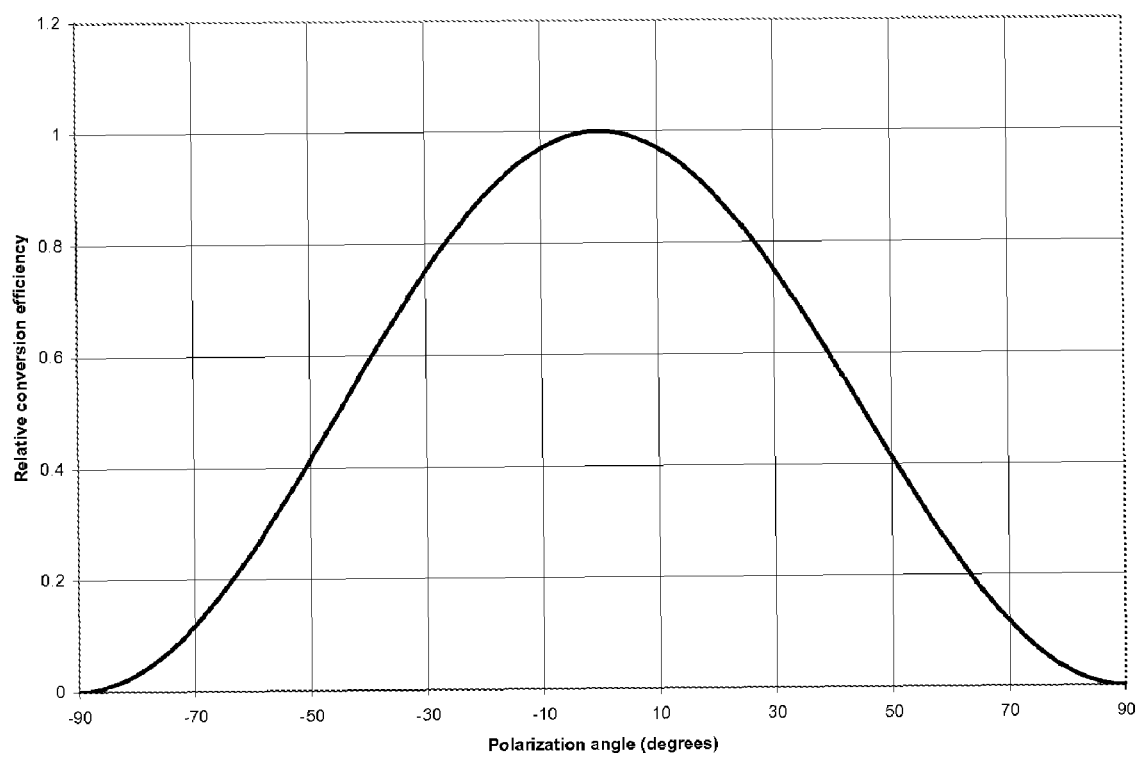
FIG. 8 is a graph illustrating conversion efficiency of an optical wavelength converter as a function of relative polarization angle.

In Eq. 4, $\Pi$ is the angle of the polarization state of the fundamental radiation entering the wavelength converter 110 relative to the polarization state which gives optimal frequency conversion. FIG. 8 depicts a graph of Eq. 4. As may be seen from Eq. 4 and FIG. 8 control of the polarization angle $\Pi$ allows for precise control of wavelength-converted pulse energy. For example, signals from the controller 101 may be operably coupled to an electro-optic polarization rotator in the seed source 102 or coupling optics 105. For example, the coupling optics 105 may include a tunable birefringent element, such as an electro-optic switch or spooled fiber with a piezo-electric element, which may be controlled in response to signals from the controller 101. By appropriately adjusting the polarization of amplified output 109, the wavelength conversion efficiency $\eta$ of the wavelength converter 110 can be controlled. For certain types of nonlinear materials, e.g., PPLN the polarization angle $\Pi$ may be controlled by applying a strain to the nonlinear material, e.g., using a piezo-electric material to apply the strain. Such a strain may be controlled in response to signals from the controller 101.

Alternatively, coupling optics 105 may contain a polarizing element following a tunable birefringent element. In this case, the amplified output 109 input to wavelength converter 110 can be varied in a manner similar to that illustrated in FIG. 8.

Preferred Embodiment

In a preferred embodiment, the pulses in amplified output 109 have substantially the same shape as the pulses in seed radiation 104 and amplified output 109 has the same duty cycle D has seed radiation 104. Also in the preferred embodiment, power amplifier 108 is highly saturated, so that the average power of amplifier output 109, $P^{\omega 1}_{avg}$, is approximately independent of the average power of seed radiation 104. The peak power of the pulses in amplified output 109, $P_{pk}$, is given by: $P_{pk} = P^{\omega 1}_{avg}/D$. The average wavelength converted power, $P^{\omega 2}_{avg}$, is changed by changing the duty cycle D of seed radiation 104. When duty cycle D changes, peak power $P_{pk}$ changes, thereby changing the conversion efficiency $\eta$, and hence wavelength converted power $P^{\omega 2}_{avg}$. Thus the wavelength converted power is controlled by changing the duty cycle of seed radiation 104, and not altering the operating conditions of power amplifier 108.

Although the above embodiment is preferred, the invention encompasses other embodiments, such as (1) the case when power amplifier 108 is not saturated; (2) the case when the pulses in amplified output 109 do not have the same shape as the pulses in seed radiation 104 due to distortion within power amplifier 108; and (3) other methods of changing the conversion efficiency $\eta$. These and other embodiments are described herein.

Example of System Operation

The above concepts may be illustrated by a numerical example. The following example is not intended to limit the scope of the invention in any way. For this example, square input pulses may be assumed for mathematical convenience. However, such a restriction on pulse shape is not necessary in practice. A pulse repetition frequency PRF of 100 KHz and a pulse width $\tau$ of 10 nanoseconds (ns) is assumed. These values yield a duty cycle D of $10^{-3}$ or 0.1%. The pump power applied to the power amplifier 108 is assumed to be 40 watts and an average output power $P^{\omega 1}_{avg}$ of the amplified output 109 from the power amplifier 108 is assumed to be 30 watts. This implies a 75% conversion efficiency for the power amplifier 108. Such a value is reasonable for a gain medium such as Yb:glass fiber. The peak power $P_{pk}$ may be determined from $P^{\omega 2}_{avg}/D = 30$ watts/$10^{-3} = 30$ kilowatts (kW). For second harmonic conversion in a 2 cm length of LBO equation 2 and FIG. 6 yield a conversion efficiency $\eta$ of 52.9% for this value of peak power. This implies an average wavelength-converted power $P^{\omega 2}_{avg}$ of 15.9 watts.

Suppose the user wishes to reduce the average power by 10%. This implies a 10% reduction in conversion efficiency $\eta$ to 48%. From Eq. 2 and FIG. 6, the peak power $P_{pk}$ for a 48% conversion efficiency is about 21 kW. For a square pulse, the duty cycle D is also a measure of the ratio of average power $P^{\omega 1}$ to peak power $P_{pk}$. Thus to obtain the desired conversion efficiency $\eta$ of 48% the duty cycle D must change to D=0.1%*30 W/21 kW=0.143%. Therefore, to reduce the average power by 10%, the controller 101 adjusts duty cycle to 0.143%. Specifically, the controller 101 may generate a pulse train that controls the drive current of a diode laser in the seed source 102. The duty cycle of the pulse train may be adjusted electronically, either in hardware or software that implements the controller logic 121.

Alternative Embodiments

Numerous variations may be devised on the embodiments set forth above. For example, the average wavelength converter power may be adjusted by tuning the wavelength of the seed radiation from the seed source 102. Specifically, semiconductor laser devices may be tuned thermally. Such tuning is typically slow, e.g., on a scale of a few kilohertz or less.

Alternatively, some specialized distributed Bragg reflector (DBR) devices may be tuned electo-optically, which allows for a very fast tuning rate, e.g., greater than 1 Megahertz.

Figure 9:
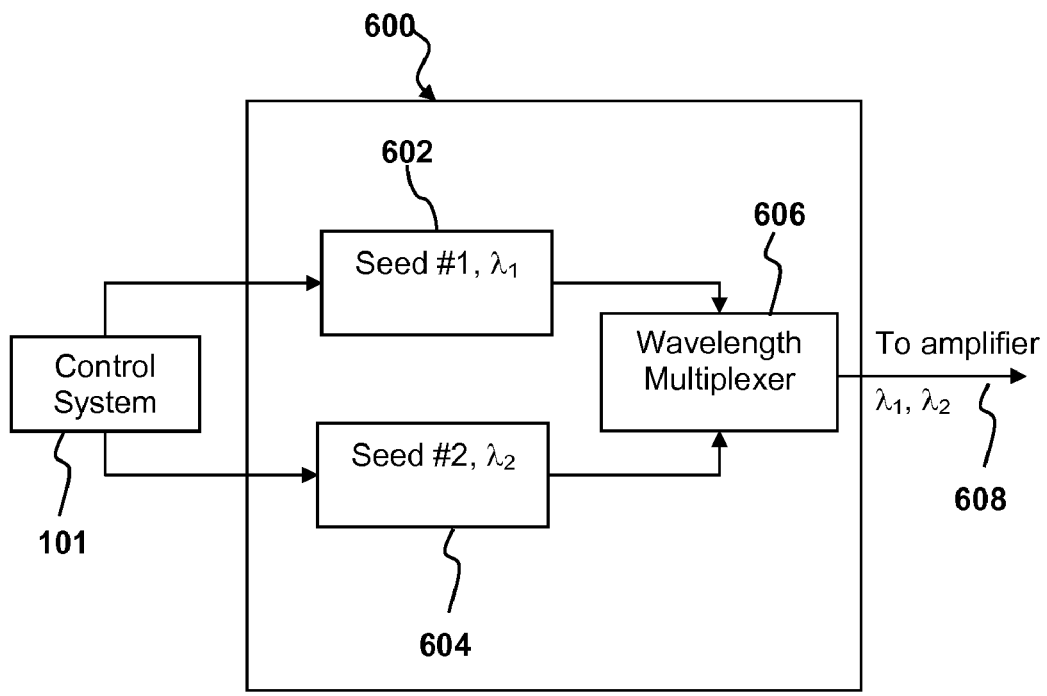
FIG. 9 is a schematic diagram illustrating a seed source having dual radiation sources that may be used in alternative embodiments of the present invention.

In a particular alternative embodiment depicted in FIG. 9, a seed source 600 may include two or more radiation sources 602, 604 that generate seed radiation outputs characterized by two different wavelength distributions characterized by first and second seed wavelengths $\lambda_1$ and $\lambda_2$ respectively. The first seed wavelength $\lambda_1$ is within the spectral acceptance of the wavelength converter 110 and is phasematched for the wavelength conversion process taking place there. The second seed wavelength $\lambda_2$ is outside the spectral acceptance of the wavelength converter 110. The two radiation sources 602, 604 may be separate laser diodes or other laser sources. Alternatively, two radiation sources 602 and 604 may be ASE sources or a combination of laser and ASE sources. Each radiation source 602, 604 may be independently controlled by signals, e.g., from the controller 101. The seed radiation outputs from the radiation sources 602, 604 may be mixed by a multiplexer 606 to produce seed radiation 608 containing selected amounts of the radiation of both wavelength distributions. The seed radiation may be inserted into the pre-amplifier 106 or power amplifier 108. Since the second wavelength $\lambda_2$ lies outside the spectral acceptance of the wavelength converter 110 only amplified radiation associated with the first wavelength $\lambda_1$ contributes to the wavelength converted output 111. Thus, the wavelength converted average power $P^{\omega2}_{avg}$ may be adjusted by adjusting the ratio of the two seed radiation outputs.

Preferably both wavelengths $\lambda_1$ and $\lambda_2$ lie within the spectral bandwidth of the optical amplifier 103 particularly the spectral bandwidth of the power amplifier 108. If so, both seed radiation signals will be amplified even though only one of them contributes to the wavelength converted output power. The advantage of this is that it allows very rapid adjustment of $P^{\omega2}_{avg}$ without deleterious gain build up in the power amplifier 108. As noted above, it is often desirable to maintain a substantially constant pumping power to the power amplifier 108. However, if the amplifier 108 does not amplify input radiation while it is being pumped, gain may build up in the amplifier to the point that the amplifier is damaged. The use of two different wavelengths of seed radiation allows gain to be rapidly shifted from wavelengths that are converted by the wavelength converter 110 to those that are not and vice versa while the pump power is relatively constant. Thus energy may be extracted from the power amplifier 108 without generating wavelength converted output.

Figure 10A:
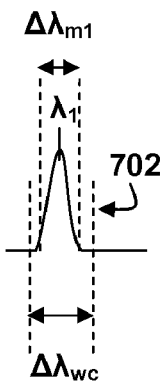
FIGS. 10A-10B are timing diagrams illustrating the effect of stimulated Raman scattering on an optical pulse.
Figure 10B:
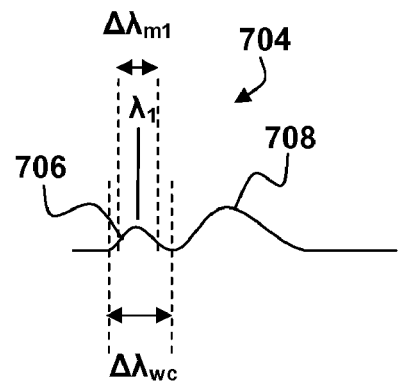

In a further variation on the concept described above, the pulse shape of the seed radiation 104 emitted by the seed source 102 may be controlled so that some portion of a pulse has high peak power that generates stimulated Raman scattering (SRS), e.g., in the pre-amplifier 106 and/or power amplifier 108 and/or coupling optics 105 and/or in the optical path between the pre-amplifier 106 and the power amplifier 108. Specifically, as shown in FIG. 10A, a pulse 702 of seed radiation 104 from the seed source 102 may be characterized by a vacuum wavelength $\lambda_1$ and spectral bandwidth $\Delta\lambda_{m1}$ that lie within the acceptance bandwidth $\Delta\lambda_{WC}$ of the wavelength converter 110. The pulse 702 may also have a sufficiently high peak power $P_{pk}$ to generated SRS as indicated in FIG. 10B. The SRS spreads out the spectral bandwidth of the resulting amplified output pulse 704 that is coupled into the wavelength converter 110. The amplified output pulse includes an amplified seed portion 706 characterized by the vacuum wavelength $\lambda_1$ and a SRS-broadened portion 708. The SRS broadened portion 708 of the amplified output pulse 704 may lie outside the spectral bandwidth $\Delta\lambda_{WC}$ of the wavelength converter. The SRS broadened portion 708 uses energy that would otherwise go into the seed portion 706. By adjusting the peak power of the pulse 702 the amount of power in the seed portion 706 and SRS-broadened portion 708 may be controlled. Therefore, by controlling the amount of SRS occurring in the amplifier 103 or coupling optics 105 the wavelength conversion efficiency $\eta$ may be controlled.

By way of numerical example, and without limitation of embodiments of the invention, consider a SRS frequency shift in silica fiber of approximately 440 cm$^{-1}$. This corresponds to shifting 1064-nm radiation to 1117-nm radiation. By way of example, a Yb-doped silica fiber used as a gain medium in the power amplifier 108. Such a fiber may extract gain from radiation at 1117 nm. However, the Raman-shifted portion 708 of the amplified output pulse 704 may be well outside the acceptance bandwidth of the nonlinear element in the wavelength converter 110. In such a case, the Raman-shifted portion 708 would not contribute to the wavelength-converted output 111.

Figure 10C:
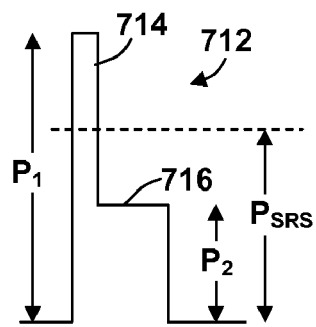
FIG. 10C is a timing diagram of an example of an optical pulse illustrating the use of pulse shaping to control wavelength conversion efficiency according to an embodiment of the present invention.

The amount of Raman shifting may be adjusted, e.g., by control of the pulse shape of the seed radiation 104 from the seed source. For example, as illustrated in FIG. 10C, a seed pulse 712 may include a high power portion 714 and a low power portion 716. The high power portion 714 may be characterized by a power $P_1$ that is above a threshold $P_{SRS}$ for stimulated Raman scattering. The low peak power portion 716 may be characterized by a peak power $P_2$ that is below the threshold $P_{SRS}$. By adjusting $P_1$ and/or $P_2$ and/or the relative durations of the high and low peak power portions 714, 716 the amount of stimulated Raman scattering generated by the seed pulse 712 may be controlled.

Embodiments of the present invention have a number of practical applications. For example, laser systems having amplified and wavelength-converted outputs generated may find application in laser material processing systems.

Embodiments of the present invention provide several advantages. For example, embodiments of the present invention allow for high-bandwidth operation. Power and energy in wavelength converted pulses may be precisely adjusted on a pulse-to-pulse basis. The bandwidth is primarily limited by the nominal system pulse repetition rate. Embodiments of the present invention also allow for precise control of wavelength converted pulse energy. Furthermore, amplifier pump sources, such as laser diodes may be run at constant or nearly constant average power. This simplifies the thermal control loops and makes optimization of the pump source wavelength to the amplifier absorption spectrum easier. This also may extend the lifetime of the pump source and may also reduce requirements for high power electronics. Thus high power wavelength-converted laser systems may be economically, manufactured and used. Embodiments of the invention may also increase the wavelength stability of pump diodes since the thermal load on the pump diode may be made more stable. This allows use of a shorter length of fiber, since diode wavelength may be held more closely to match the absorption peak of the gain material.

In addition, in embodiments of the present invention, the output beam characteristics may be made independent of average power, particularly in single mode fiber systems. Embodiments of the invention may reduce thermal cycling on the power amplifier by maintaining a constant or nearly constant thermal load. Reduced thermal cycling may result in improved mounting stability of the output end of the fiber, which results in better beam pointing. In addition, embodiments of the present invention may reduce the likelihood of fiber failure due to repeated thermal cycling. Furthermore, embodiments of the present invention may reduce the likelihood of system damage. An optical amplifier may suffer catastrophic failure if gain is not removed from the amplifier. Certain embodiments allow extraction of approximately constant average power from the amplifier to avoid gain build up.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for controlling an average wavelength-converted power; comprising:
    generating one or more seed pulses;
    amplifying the seed pulses with an optical amplifier to produce one or more amplified pulses;
    wavelength-converting the amplified pulses to produce one or more wavelength converted pulses;
    determining an average wavelength-converted power of the one or more wavelength converted pulses; and
    controlling the average wavelength-converted power over a time scale comparable to a pulse period of the amplified pulses without substantially adjusting an average power of the amplified pulses over the time scale comparable to a pulse period of the amplified pulses.

2. The method of claim 1 wherein the pulse period is less than about 1 millisecond.

3. The method of claim 1 wherein amplifying the seed pulses includes supplying pumping energy to an optical amplifier, wherein an average pump power supplied to the optical amplifier remains substantially constant over a time scale comparable to a pulse period of the amplified pulses.

4. The method of claim 1 wherein controlling the average wavelength-converted power includes adjusting a peak power of the amplified pulses and/or adjusting an optical spectrum of the amplified pulses and/or adjusting a polarization of the amplified pulses.

5. The method of claim 4 wherein adjusting a peak power of the amplified pulses includes adjusting a duty cycle of the seed pulses and/or adjusting a pulse repetition frequency of the seed pulses.

6. The method of claim 5, further comprising maintaining an approximately constant average power of the seed pulses.

7. The method of claim 4 wherein adjusting an optical spectrum of the amplified pulses includes changing an optical spectrum of the seed pulses.

8. The method of claim 4 wherein adjusting an optical spectrum of the amplified pulses includes adjusting a peak power of at least a portion of one or more seed pulses in such a way that the seed pulses generate stimulated Raman scattering in an optical amplifier.

9. The method of claim 4 wherein adjusting an optical spectrum of the amplified pulses includes adjusting a ratio of a first and a second radiation coupled to a wavelength converter, wherein the first radiation is characterized by a first wavelength that lies within a spectral acceptance bandwidth of the wavelength converter, wherein the second radiation is characterized by a second wavelength that lies outside the spectral acceptance bandwidth of the wavelength converter.

10. The method of claim 9 wherein the second radiation lies within a wavelength such that the second radiation is amplified by an optical amplifier used for amplifying the seed pulses.

11. The method of claim 9 wherein generating one or more seed pulses includes generating seed pulses containing electromagnetic radiation of the first and second wavelengths.

12. The method of claim 4 wherein adjusting a polarization of the amplified pulses includes using a tunable birefringent element optically coupled between an optical amplifier and a wavelength converter.

13. The method of claim 1 further comprising chirping the seed pulses to avoid stimulated Brillouin scattering in an optical amplifier used for amplifying the seed pulses.

14. The method of claim 1 wherein generating one or more seed pulses includes generating one or more seed pulses characterized by a spectral bandwidth that is broader than a spectral bandwidth of a wavelength converter used for wavelength-converting the amplified pulses.

15. The method of claim 1 wherein wavelength-converting the amplified pulses includes a nonlinear interaction selected from the group of second harmonic generation and/or third harmonic generation and/or fourth harmonic generation, and/or higher harmonics, and/or generation of sum or difference frequencies between frequencies of the seed pulses and/or one or more harmonics and/or optical parametric oscillation.

16. The method of claim 1 wherein wavelength-converting the amplified pulses includes a nonlinear interaction selected from the group of Raman scattering, Brillouin scattering, and self-phase modulation.

17. The method of claim 1, further comprising monitoring a power of the wavelength-converted pulses to produce a feedback signal, wherein controlling the average wavelength-converted power includes adjusting the wavelength converted power in response to the feedback signal.

18. The method of claim 1, further comprising coupling at least a portion of the wavelength-converted pulses to a target and detecting a feedback signal from the target, wherein controlling the average wavelength-converted power includes adjusting the wavelength converted power in response to the feedback signal.

19. The method of claim 1 wherein generating one or more seed pulses includes generating one or more seed pulses with an amplified spontaneous emission (ASE) source.

20. A wavelength-converted system, comprising a seed source;
    an optical amplifier optically coupled to the seed source;
    a wavelength converter optically coupled to the optical amplifier; and
    a controller operably coupled to the seed source and/or optical amplifier and/or wavelength converter, the controller including logic adapted to control an average wavelength-converted power of an output of the wavelength converter over a time scale comparable to a pulse period of one or more amplified pulses from the optical amplifier without substantially adjusting an average power of the one or more amplified pulses over the time scale comparable to a pulse period of the one or more amplified pulses.

21. The system of claim 20 wherein the logic is adapted to adjust a peak power of one or more amplified pulses generated by the optical amplifier and/or adjust an optical spectrum of the amplified pulses and/or adjust a polarization of the amplified pulses.

22. The system of claim 20 wherein the logic is adapted to adjust a duty cycle and and/or a pulse repetition frequency of one or more seed pulses that are generated by the seed source and input to the optical amplifier.

23. The system of claim 22 wherein the logic is adapted to maintain an approximately constant average power of the seed pulses.

24. The system of claim 20 wherein the logic is adapted to adjust an optical spectrum of the seed pulses.

25. The system of 20 wherein the logic is adapted to adjust a peak power of at least a portion of one or more seed pulses in such a way that the amplified seed pulses generate stimulated Raman scattering.

26. The system of claim 20 wherein the logic is adapted to adjust a ratio of amounts of a first and a second radiation coupled to the wavelength converter, wherein the first radiation is characterized by a first wavelength that lies within a spectral bandwidth of the wavelength converter, wherein the second radiation is characterized by a second wavelength that lies outside the spectral bandwidth of the wavelength converter.

27. The system of claim 26 wherein the second radiation lies within a wavelength range such that the second radiation is amplified by the optical amplifier.

28. The system of claim 26 wherein the seed source includes:
a first radiation source adapted to generate the first radiation,
a second radiation source adapted to generate the second radiation, and
a wavelength multiplexer optically coupled to the first and second seed radiation.

29. The system of claim 28 wherein the logic is operably coupled to the first and/or second radiation sources, wherein the logic and/or control circuitry is adapted to control a ratio of amounts of the first and second radiation coupled to the multiplexer.

30. The system of claim 29 wherein the second radiation lies within a wavelength such that the second radiation is amplified by the optical amplifier.

31. The system of claim 20, further comprising a tunable birefringent element optically coupled between the optical amplifier and the wavelength converter.

32. The system of claim 31 wherein the logic is operably coupled to the tunable birefringent element, wherein the logic and/or circuitry is adapted to adjust a polarization of light transmitted by the tunable birefringent element.

33. The system of claim 20, further comprising a power monitor adapted to receive at least a portion of the output of the wavelength converter and generate a feedback signal in response to the portion of the output and a feedback loop coupled between the power monitor and the controller, wherein the logic is adapted to adjust the average wavelength-converted power in response to the feedback signal.

34. The system of claim 20, further comprising a feedback sensor adapted to generate a feedback signal in response to an interaction between at least a portion of the output of the wavelength-converter and a target, and a feedback loop coupled between the feedback sensor and the controller, wherein the logic is adapted to adjust the average wavelength-converted power in response to the feedback signal.

35. The system of claim 20 wherein the seed source is an amplified spontaneous emission (ASE) source.

36. A method for controlling a wavelength-converted pulse energy; comprising:
generating one or more seed pulses;
amplifying the seed pulses with an optical amplifier to produce one or more amplified pulses;
wavelength-converting the amplified pulses to produce one or more wavelength converted pulses; and
controlling a wavelength-converted pulse energy of the one or more wavelength converted pulses by adjusting a wavelength conversion efficiency without substantially changing a pulse energy of the amplified pulses.

37. The method of claim 36 wherein generating one or more seed pulses includes generating one or more seed pulses with an amplified spontaneous emission (ASE) source.

38. A wavelength-converted optical system, comprising:
a seed source;
an optical amplifier optically coupled to the seed source;
a wavelength converter optically coupled to the optical amplifier; and
a controller operably coupled to the seed source and/or optical amplifier and/or wavelength converter, the controller including logic adapted to control a pulse energy of a wavelength-converted output of the wavelength converter by adjusting a wavelength conversion efficiency without substantially changing a pulse energy of amplified pulses from the optical amplifier.

39. The system of claim 38 wherein the seed source is an amplified spontaneous emission (ASE) source.

40. The method of claim 18, wherein adjusting the wavelength converted power in response to the feedback signal includes adjusting the seed source in response to the feedback signal to vary a wavelength conversion efficiency of a wavelength converter that wavelength converts the amplified pulses in a way that produces a desired average wavelength converted power or pulse energy of the wavelength converted pulses.

41. The system of claim 33, wherein the controller is coupled to the seed source in a feedback loop to vary a wavelength conversion efficiency of the wavelength converter in response to the feedback signal.

42. The method of claim 1, wherein controlling the average wavelength converted power includes adjusting a seed source used in generating the one or more seed pulses in response to a signal from a controller.

43. The system of claim 20, wherein the logic is adapted to adjust the seed source to control the average wavelength-converted power of the output of the wavelength converter.

44. The system of claim 38 wherein the seed source is configured to produce seed pulses in the form of intermittent bursts of pulses.

45. The system of claim 38 wherein the controller includes logic configured to control a pulse period T on a pulse-to-pulse basis.

46. The system of claim 38 wherein a pulse shape of seed radiation from the seed source is pre-distorted to compensate for pulse distortion in the optical amplifier.

* * * * *